A. C. V. MALM.
ROTARY BLANK CUTTING MACHINE.
APPLICATION FILED JUNE 14, 1917.
1,363,526. Patented Dec. 28, 1920.
6 SHEETS—SHEET 1.
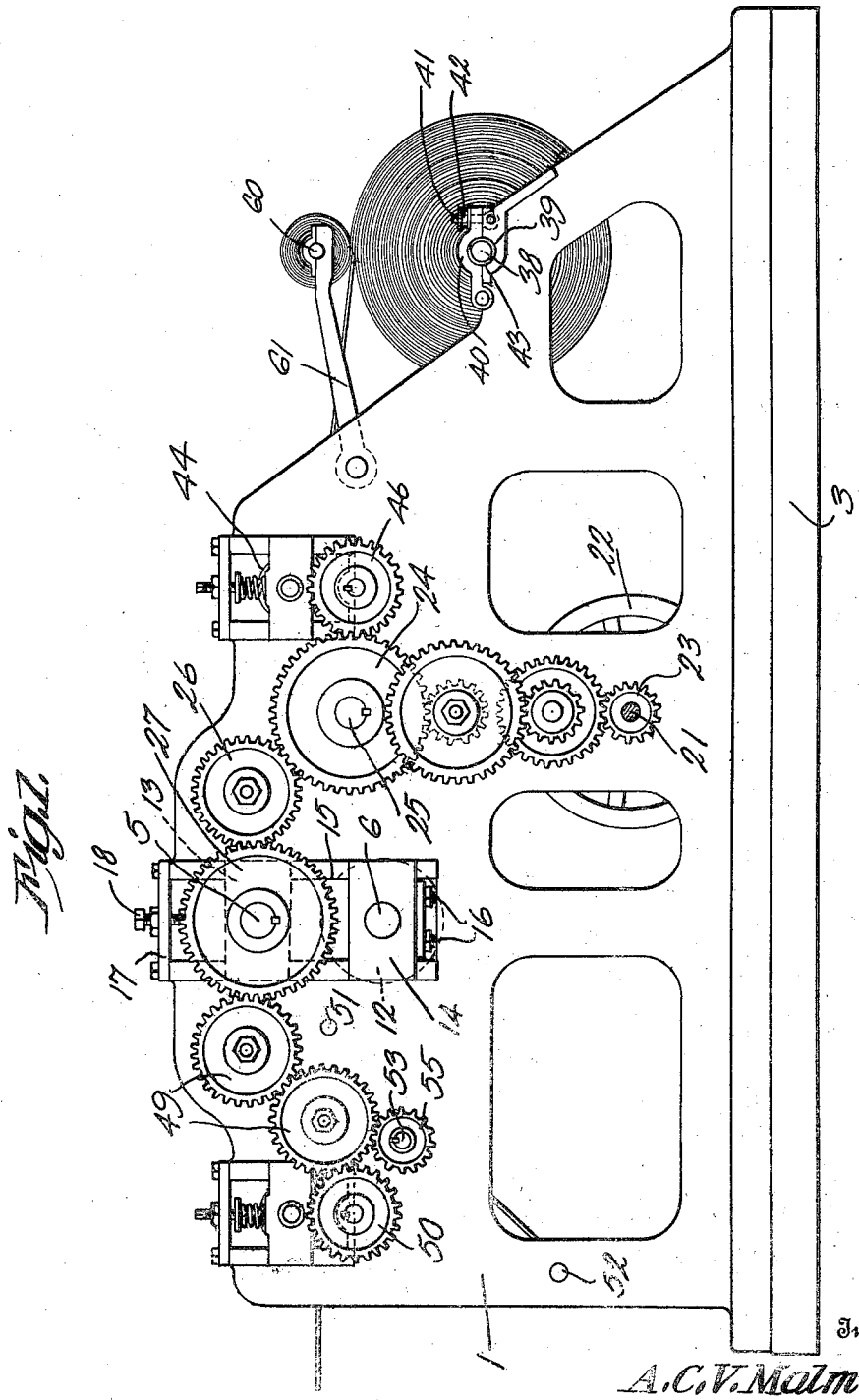
Inventor
A. C. V. Malm,
By Edward Reed.
Attorney

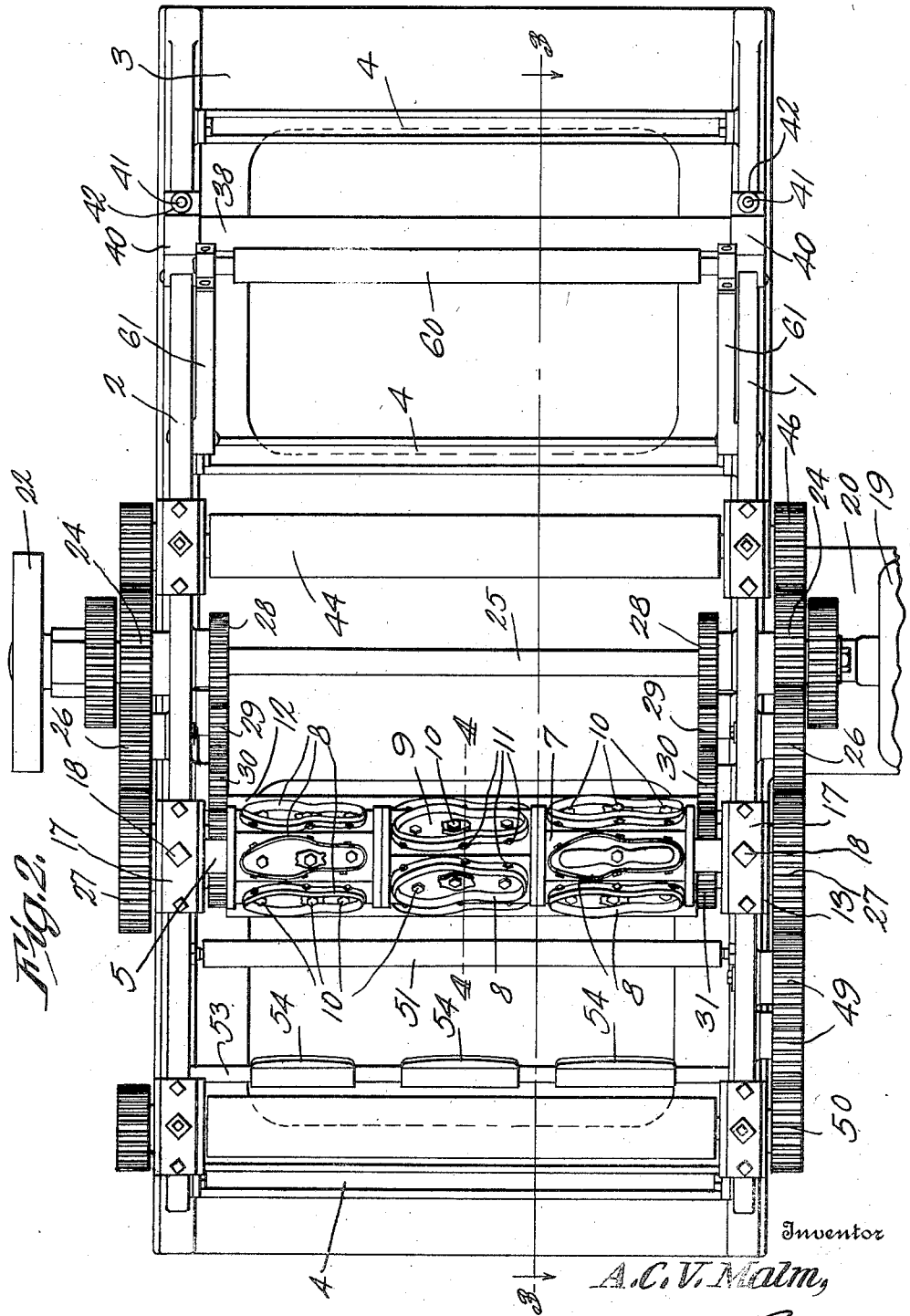

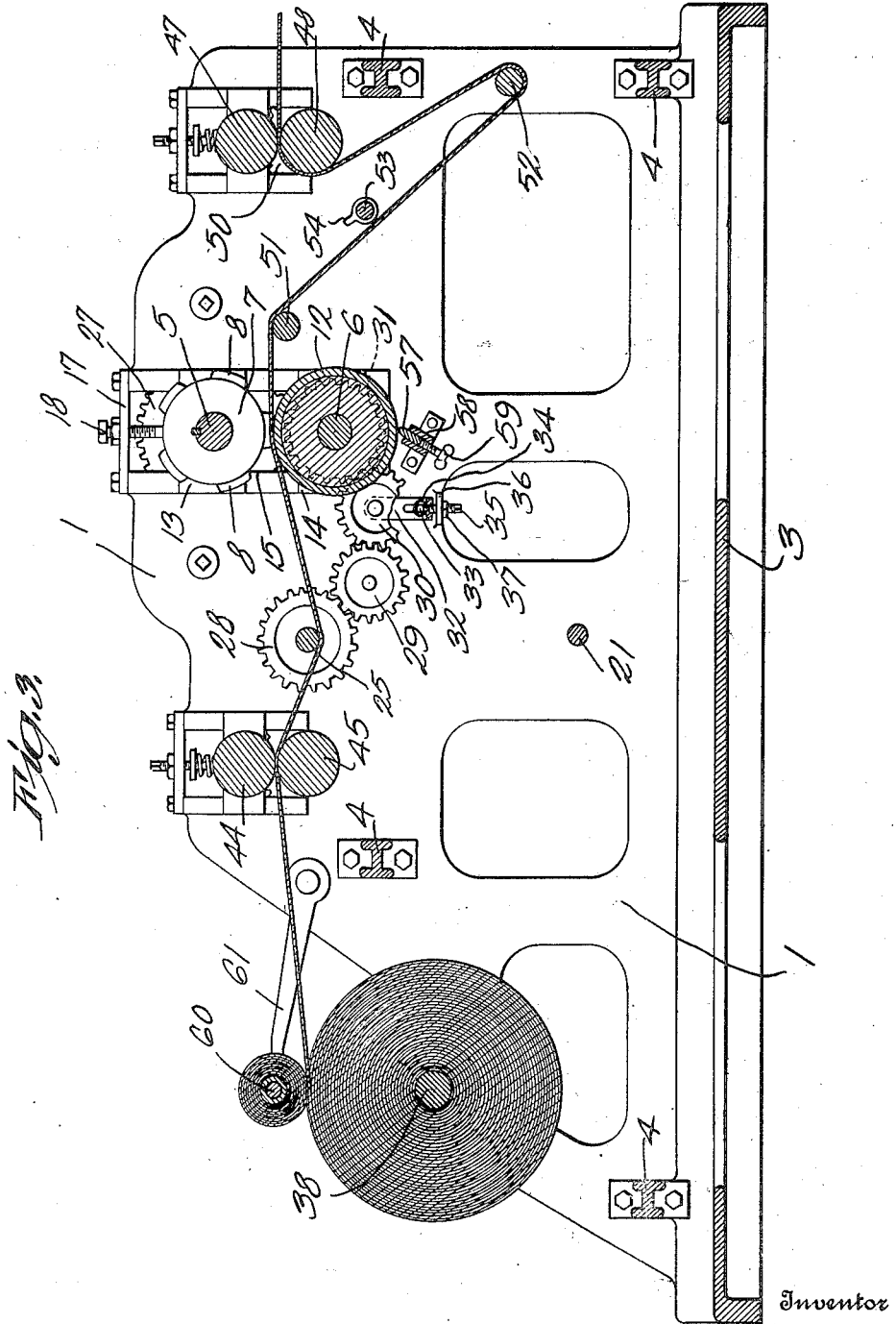

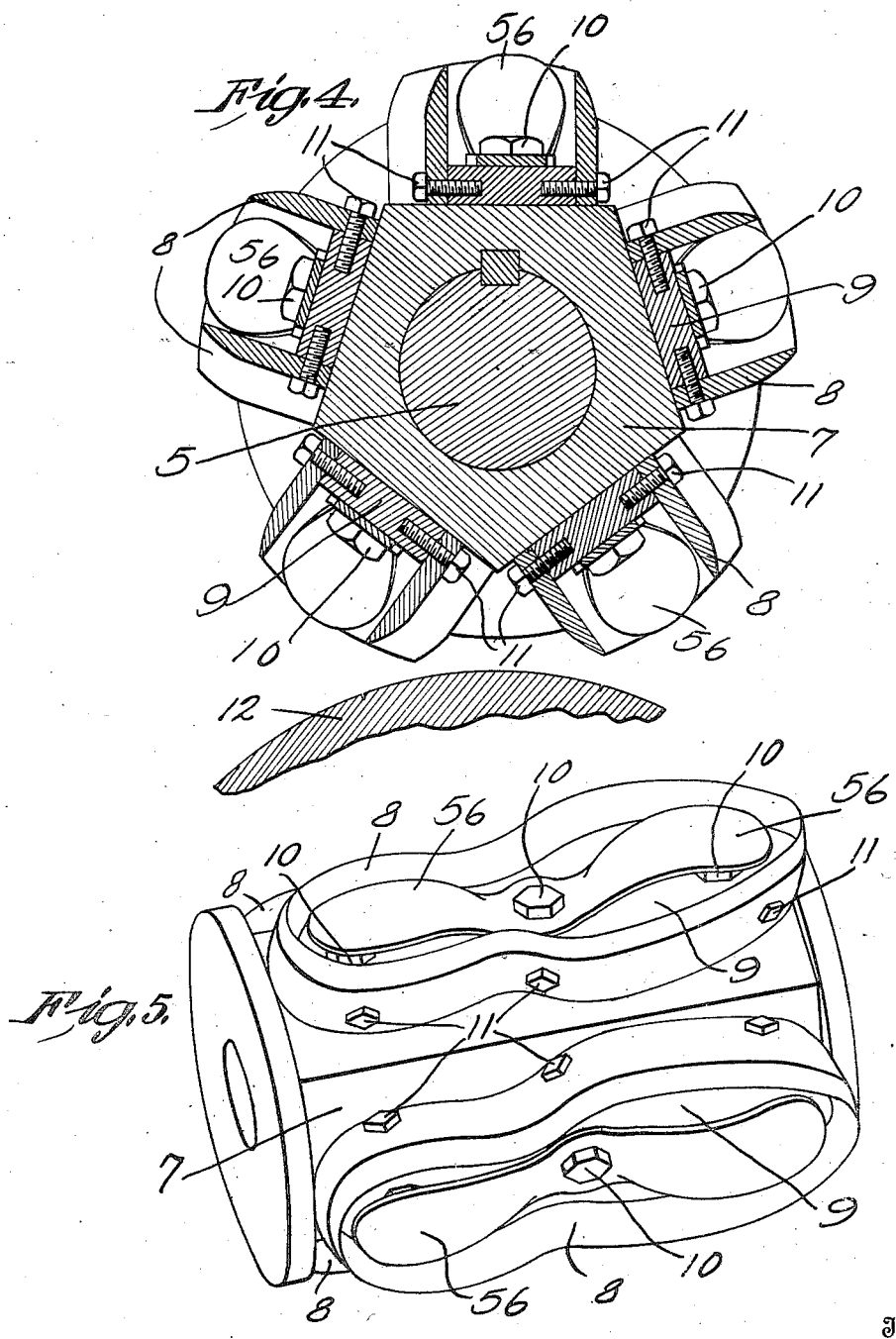

A. C. V. MALM.
ROTARY BLANK CUTTING MACHINE.
APPLICATION FILED JUNE 14, 1917.
1,363,526.
Patented Dec. 28, 1920.
6 SHEETS—SHEET 5.
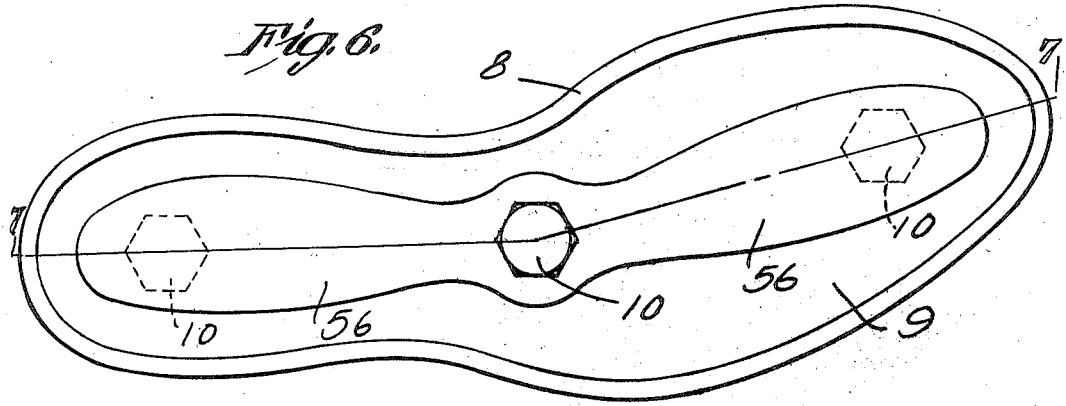
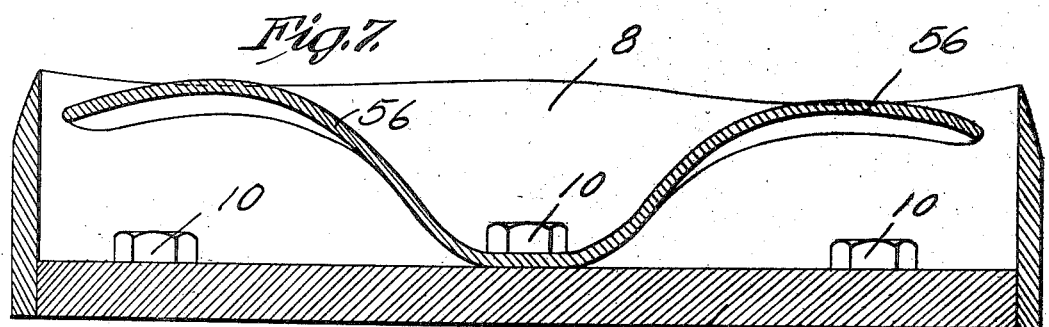
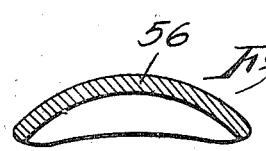
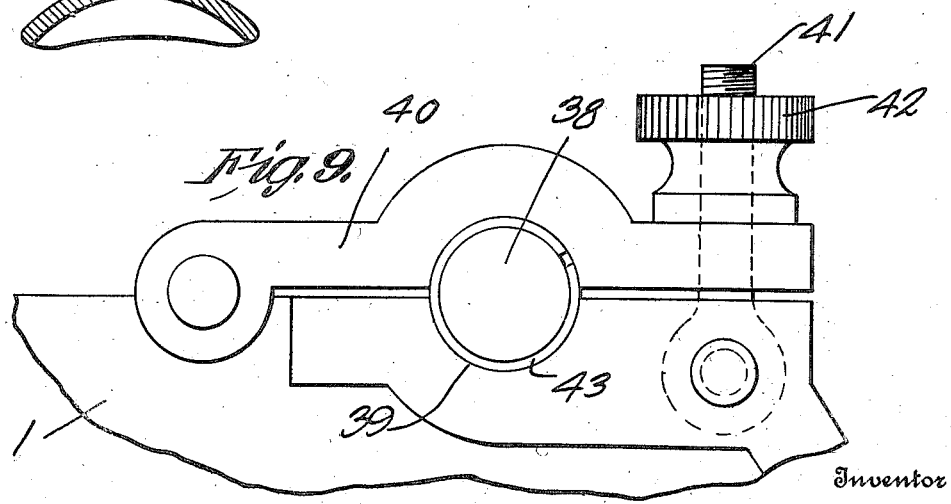
Inventor
A. C. V. Malm,

A. C. V. MALM.
ROTARY BLANK CUTTING MACHINE.
APPLICATION FILED JUNE 14, 1917.

1,363,526.

Patented Dec. 28, 1920.
6 SHEETS—SHEET 6.

Inventor
A. C. V. Malm,
By Edward J. Reid
Attorney

UNITED STATES PATENT OFFICE.

AXEL C. V. MALM, OF DAYTON, OHIO, ASSIGNOR TO THE MALM MACHINE COMPANY, OF DAYTON, OHIO, A CORPORATION OF OHIO.

ROTARY BLANK-CUTTING MACHINE.

1,363,526.      Specification of Letters Patent.      Patented Dec. 28, 1920.

Application filed June 14, 1917. Serial No. 174,706.

*To all whom it may concern:*

Be it known that I, AXEL C. V. MALM, a citizen of the United States, residing at Dayton, in the county of Montgomery and State of Ohio, have invented certain new and useful Improvements in Rotary Blank-Cutting Machines, of which the following is a specification, reference being had therein to the accompanying drawing.

This invention relates to rotary blank cutting machines and more particularly to a rotary machine for cutting blanks from a web, or sheet, of flexible material, such as shoe soles from a web of rubber composition.

The object of the invention is to provide a rotary cutting mechanism of a simple construction which will operate at a very high rate of speed and will complete the severance of each blank at one operation. To this end it is also an object of the invention to provide a mechanism comprising but few parts and to so construct these parts as to cause the proper feeding of material, and to enable the necessary adjustments to be made.

It is also an object of the invention to provide means for removing from the stock a layer of protecting fabric; to provide means for dislodging severed blanks from the web of material; and to provide means to prevent the severed blanks from adhering either to the cutter or to the drum.

Other objects of the invention will appear as the mechanism is described in detail.

Figure 10:
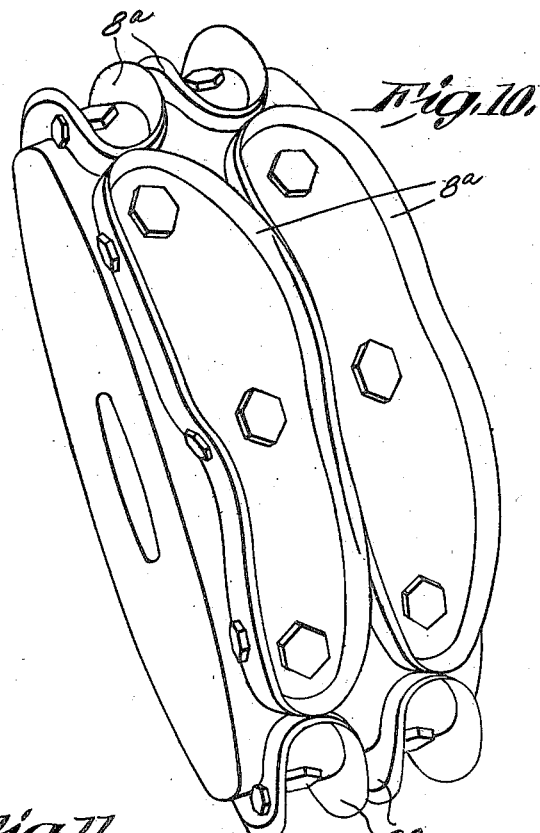
Figure 11:
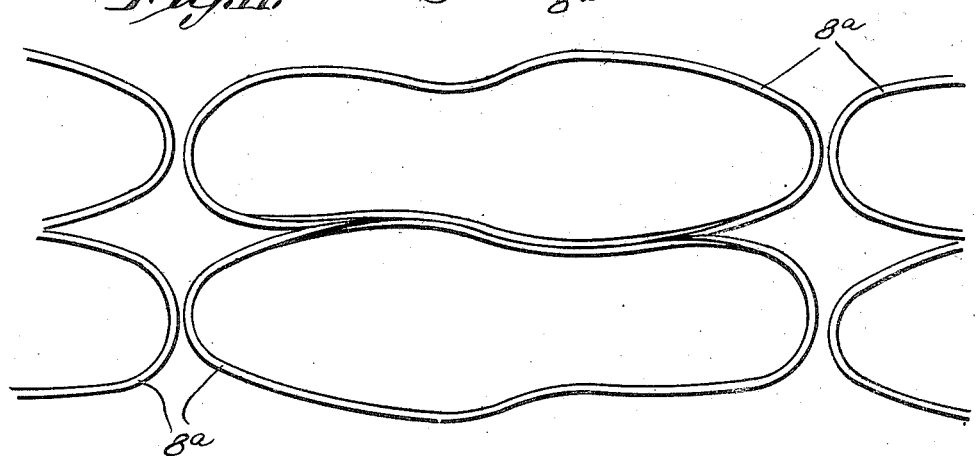

In the accompanying drawings Figure 1 is a side elevation of a machine embodying my invention; Fig. 2 is a top plan view of the same; Fig. 3 is a longitudinal sectional view taken on the line 3—3 of Fig. 2; Fig. 4 is a transverse sectional view of the cutter head and a portion of the drum taken on a line extending through the cutters; Fig. 5 is a detail perspective view of the cutter head; Figs. 6, 7 and 8 are detail views of one of the cutters showing the blank ejectors; Fig. 9 is a detail view showing the retarding device for the supporting shaft for the roll of stock; Fig. 10 is a perspective view of a cutter head showing a different arrangement of the cutters thereon; and Fig. 11 is a lay-out of a portion of this cutter head to show the position of the cutters relatively one to the other.

In these drawings I have illustrated one form of my invention and have shown the same as embodied in a machine for cutting shoe soles from flexible stock, such as rubber composition, which usually comes in rolls. It will be understood, however, that this embodiment of the invention is chosen for the purpose of illustration only and that the invention can be adapted to cut blanks of various kinds from materials of various kinds, either webs or sheets, without departing from the spirit of the invention.

As illustrated in these drawings the machine comprises a main frame consisting of side members 1 and 2 mounted on a base 3 and connected one to the other by suitable transverse tie bars 4. Mounted between the side members of this frame, preferably in the upper portion thereof, and between the ends thereof, are two parallel shafts 5 and 6. The upper shaft 5 carries a circumferentially arranged series of skeleton cutters with which coöperates a drum mounted on the shaft 6. In that form of the device shown in Figs. 2 to 5 the cutters are carried by a head 7 keyed to the shaft 5 and having its circumferential surface divided into a series of longitudinally extending faces, which are preferably flat, and to each of which is secured a cutter 8. The skeleton cutters conform in shape to the outline of the blank which is to be cut and have continuous cutting edges, so that each operation of each cutter will completely sever a blank. The cutters may be constructed and arranged upon the cutter head in any suitable manner. As shown in Figs. 2 to 5 each cutter comprises a continuous flange extending outwardly from a base plate 9 which rests upon and is detachably secured to one of the flat faces of the cutter head 7. A series of screws, 10, preferably three in number, extend through the base plate into the cutter head, thus rigidly securing the cutter to the head, but permitting it to be quickly and easily removed so that it may be sharpened or repaired, or to permit another cutter to be substituted therefor. As here shown the continuous flange, which constitutes the cutter proper, is formed separate from the base plate and is secured thereto by screws 11, but this feature is not essential to the operation of the device and it has been adapted to facilitate the manufacture of the cutters. The cutters coöperate with a drum 12 rigidly secured to the shaft 6 and adapted to rotate in the opposite direction from that in which the cutter rotates so that the cutters and the adjacent portion of the drum will travel in the same direction. To provide for a perfect coöperation between the cutters and the drum and to cause each portion of the cutter to occupy the same position with relation to the drum, as it passes the same, and thus cause an equal cutting action throughout the edge of the cutter, the edges of the several cutters are so ground that they lie in a circle described about the axis of the shaft 5, the radii of all portions of the cutting edge of each cutter being exactly the same.

The shaft 5 may be provided with any suitable number of sets of cutters and these cutters may be carried by one or more cutter heads. In the arrangement shown the length of the blank with relation to the width of the stock is such that three blanks may be cut across the width of the stock, and I have, therefore, provided the shaft 5 with three sets of cutters, each set being carried by its individual cutter head, and each cutter head being separately removable from the shaft. The circumferential arrangement of the cutters may also be varied according to the pattern and the stock. In the present instance the cutters are so arranged that sufficient stock is left between cuts to form another blank, and by running the stock a second time blanks can be cut from this intervening stock so that the waste is reduced to a minimum.

As has been stated, the cutters may be arranged on the head in any suitable manner, and in Figs. 10 and 11 I have shown another arrangement of cutters designed to more completely utilize the stock and thus reduce the waste. As shown in these figures the cutters, 8ª, are arranged with their greatest length extending circumferentially of the head, and further, they are arranged in pairs with the wide portion of one cutter along the side of the narrow portion of the other. As a result of this arrangement, for a portion of their length the adjacent walls of each pair of cutters may be formed in a single piece so that there will be no material cut out from between the blanks at this point. Preferably each cutter head is of such a width as to accommodate one pair of cutters, and is of such a circumference as to permit three pairs of cutters to be arranged end to end about the same. The cutters may be of any suitable character, but are here illustrated as of substantially the character above described except that the faces of the cutter head upon which the cutters are supported are not longitudinally extending flat faces. In this arrangement, as in that above described, the cutters have continuous cutting edges and each part of the cutting edge of each cutter is spaced the same distance from the axis of the cutter head, that is, the cutters are ground to a cylindrical form. The number of cutter heads mounted on the shaft 5 will be regulated according to the width of the stock which is being run. As will be noted from Fig. 11, a very small amount of stock remains between the blanks on each head and by placing the several heads close together a correspondingly small amount of stock will remain between the blanks cut by the adjacent heads. These cutters may, if desired, be provided with ejecting devices similar to those shown in Figs. 2 to 5, but I have not shown such ejectors in the drawings.

The drum 12 which coöperates with the cutter is preferably formed of a relatively soft material and, while the character of the material may vary, I have found that the composition metal commonly known as stereotype metal gives excellent results. The surface of the drum at its uppermost point is spaced away from the axis of the cutter head a distance slightly less than the length of the radius of the cutter head, thus causing the cutting edge of each cutter to engage the drum, and inasmuch as the cutter head and the drum are rotated at the same speed and are of the same radius, each cutter will engage the drum in exactly the same position each time it passes the same, and will, after a few revolutions, form in the drum an outline corresponding with the shape of the cutter and constituting in effect a female die. It will be understood, therefore, that the term "soft metal" as used herein is intended to include any material having sufficient body to provide proper coöperation with the cutters and which will not injure the cutters or quickly dull the same when they come in contact therewith. This material may constitute the body of the drum, or it may be in the form of a shell overlying a supporting structure of more rigid material.

The shafts 5 and 6 which support the cutter head and the drum may be mounted in the frame members 1 and 2 in any desired manner. Preferably, however, they are so mounted as to be readily movable so as to permit a change of cutter heads and of drum. I have, therefore, shown the shafts mounted, respectively, in bearing brackets 13 and 14, which are mounted in vertical openings 15 formed in the frame members. The lower bearing blocks 14 for the drum are adjustable and to this end are supported by screws 16 mounted in the frame members at the lower ends of the openings 15 and operable in a well known manner to adjust the positions of the bearing blocks. The upper end of each opening is closed by a cap plate 17, through which extends a screw 18 which bears upon the upper bearing bracket and retains the same in position.

The cutter head and its drum may be rotated from any suitable source of power and through any suitable mechanism, but the present machine is designed for use with an electric motor, a portion of which is shown at 19 in Fig. 2, and which is mounted on a base 20 at the side of the frame member 1. Connected with the motor is a main driving shaft 21 which extends transversely of the frame and is provided at a point beyond the opposite frame member 2 with a fly-wheel 22. Rigidly secured to this shaft on each side of the frame are pinions 23 which connect through a suitable train of gearing with gears 24 carried by a shaft 25, also extending transversely of the frame and journaled in the side members thereof. The gears 24 are connected through intermediate gears 26 with gears 27 secured to the respective ends of shaft 5, on the outer sides of the respective frame members. The drum is preferably separately driven and I have, in the present instance, provided for driving the same from the shaft 25 through gearing located on the inner sides of the respective frame members. As shown in Fig. 3 a gear 28 is secured to the shaft 25 close to the frame member 1, on the inside thereof, and is connected through intermediate gears 29 and 30 with a gear 31 secured to the shaft 6 between the end of the drum and the frame member, this gearing being duplicated on the opposite side of the machine. The ratios of the two trains of gearing, that is the train which drives the cutter head and the train which drives the drum, are such that the two parts will be rotated at the same speed. Inasmuch as the lower shaft 6, and its gearing, are adjustable I have also made the intermediate gear 30 adjustable. As here shown this gear 30 is mounted upon the upper end of a bracket 32 which is slidably mounted on a stud 33 carried by a frame member, and is retained thereon by a nut 34. A screw 35 mounted in a flange, or lug, 36, extending inwardly from the frame member bears against the lower end of the bracket 32, and the operation of this screw will cause the bracket to move upwardly or downwardly, the nut 34 having been previously loosened. After the adjustment is made the nut 34 is tightened down to lock the bracket against movement, and a jam-nut 37 on the screw is set to hold the screw against displacement. By means of this adjustment the intermediate gear may be maintained in proper mesh with the gear 31 in all adjustments of the latter.

As has been stated, the present machine is designed to operate upon a web of material drawn from a roll, and I have, therefore, provided means for supporting a roll at one end of the machine. This means comprises a shaft 38 mounted in bearings 39 on the respective frame members, these frame members being preferably cut away, or inclined upwardly and forwardly, to afford easy access to the roll and its supporting devices. Inasmuch as the roll of stock must be frequently renewed it is desirable that the shaft 38 should be readily removable, and I have, therefore, provided the bearings 39 with hinged caps 40 which are held in closed positions by means of screws 41 pivotally mounted on the adjacent portion of the frame member so that they may be swung into and out of slots in the adjacent ends of the bearing caps and provided with nuts 42 to lock the caps in position. Inasmuch as the stock is ordinarily very heavy and the machine operates at a high speed, it is desirable that some means should be provided for braking, or retarding, the rotation of the shaft, to maintain the stock taut as it is drawn over the roll and prevent the roll from running ahead of the feeding devices when the machine slows down. This I have accomplished by mounting in each bearing 39 a split bushing 43 of brass, bronze, or other suitable material, which fits about the shaft and which may be clamped about the same with the desired degree of pressure by tightening the nut 42 on the screw 41. The split bushing will be removed from the bearing with the shaft when the latter is removed and can be slipped off of the shaft to permit a new roll of stock to be placed thereon, and will be placed in position on the shaft before the latter is returned to its bearing. The shaft will rotate in the bushings and the latter are free to rotate in the bearings, although it is immaterial whether they do so rotate or not. This very simple device affords a highly efficient retarding action on the roll which can be adjusted at will and adds but a single part to the mechanism of the machine, and which part is inexpensive.

The stock is fed from the roll through the machine by two sets of positively driven feed rollers, one set of rollers being arranged in advance of, and the other set beyond, the cutting devices. These two sets of feed rollers are so arranged and so driven that they will maintain the stock between them taut so that it will be under tension during the cutting operation, thus insuring a clean accurate cut. The forward set of feeding rollers, 44 and 45, are driven from the gear 24 on the shaft 25 which meshes with a gear 46 on the outer end of the shaft of the roller 45 and this roller is geared, on the opposite side of the machine, with the upper roller 44. The second set of rollers, 47 and 48, are driven from the gear on one end of the cutter shaft 5, this gear being connected through suitable intermediate gears 49 with a gear 50 on the adjacent end of the shaft of the lower feed roller 49, and the two feed rollers being geared together at their opposite ends, so that both will be positively driven.

The stock, as it passes from the forward feeding rollers to the cutters, is carried about a guide rod which is, in the present instance, formed by the shaft 25, and which is located slightly below the horizontal plane in which the stock is cut, thus causing the stock to be brought into contact with the drum at a point in advance of the vertical center of the drum and insuring a proper contact between the stock and the cutter.

There is more or less tendency of the blanks to adhere either to the cutter or the drum, or to remain in the web of stock after the cut has been made, and suitable devices have been provided to prevent the blanks from thus adhering and to cause them to be properly discharged. As shown in Fig. 3, the stock as it passes from the cutters to the second set of feed rollers, or discharge rollers, is carried over a guide rod 51, thence downward about a second guide rod 52 located beneath and slightly beyond the feed rollers, thence rearwardly and upwardly to the feed rollers. By thus causing the stock to make one or more sharp turns while it is under tension the blanks are caused to be discharged therefrom. If desired, however, a positive device may be provided for ejecting the blanks from the web, and this may be used either with or without the guide rods shown. Such an ejector is shown in Figs. 2 and 3, where it is illustrated as comprising a shaft 53 having a series of projections, or knockers, 54, of a length less than the length of the blank and arranged one adjacent to each series of blanks cut from the stock. Each projection is so arranged on the shaft, and the shaft is rotated at such a speed relative to the movement of the stock, that the projections will engage each blank as it passes the knocker. In the present instance, where five blanks are cut by each set of cutters upon each rotation of the cutter shaft, the knocker shaft is rotated at five times the speed of the cutter shaft. The knocker shaft may be driven from any suitable source, but as here shown it is provided with a gear 55 which meshes with one of the intermediate gears 49 on the frame member 1, the ratio of the gears being such as to give to the shaft the desired speed of rotation.

To eject the blanks from the skeleton cutters, in case there should be any tendency to adhere therein, I have provided each cutter with an ejector, as shown in detail in Figs. 6, 7 and 8. As there shown the ejector comprises a plate 56 of metal, which is of less width than the width of the cutter and is arranged within the cutter and rigidly secured thereto, preferably by passing one of the screws 10 through the center of the plate. The plate is curved outwardly on both sides of its point of connection with the base plate of the cutter toward the plane of the cutting edge of the cutter, and toward the ends thereof. The end portions of the plate, or ejector, which are brought into contact with the stock as the cut is being made, are curved both transversely and longitudinally so as to provide always a smooth contact surface and to prevent any catching or interference between the stock and the ejector. The ejector plate is resilient so that it will yield under the pressure of the stock, while the cut is being made, but will expand as soon as the stock passes the drum, thus causing the blank to be ejected from the cutter. I prefer, however, in order to lessen the liability of breakage, that the ejector plate be tempered only at its central portion as this will afford the desired resiliency, and those parts of the plate which engage the stock or the drum when no stock is running, will not be easily broken. To remove the blanks from the face of the drum, should they tend to adhere thereto, I have provided a scraper 57 which is slidably mounted in suitable brackets 58 and is adjustable by means of screws 59 toward and from the surface of the drum. In practice the edge of the scraper is set so that it just clears the drum but will engage and detach from the drum any blanks which may adhere thereto. The blanks, as they are discharged from the web, will fall to the bottom of the machine where they may be discharged to a suitable receptacle, conveyer, or the like, no such receiving devices being here shown.

Material of the kind upon which the present machine is designed to operate is more or less sticky, because it is not cured until after the blanks have been cut. It is found necessary, therefore, in winding the web of stock into rolls to wind in with it a layer of protecting fabric, such as cheesecloth, which will prevent the successive windings of the stock from adhering to each other. This fabric should be removed before the stock passes through the cutters and I have, therefore, provided means for automatically taking care of the same. As here shown this means comprises a roller 60 arranged above, and adapted to rest loosely upon the upper surface of, the roll so that it will be engaged and actuated by the stock as the latter is unwound from the roll. By attaching the end of the fabric which is to be removed to the roller, as by passing it about the same until the end is overlapped, and allowing the roll to rest upon the stock the fabric will be wound about the drum, thus not only removing it from the stock, but rewinding it so that it can be easily handled. The roller is so mounted that it can move downward with the upper surface of the roll of stock as the latter decreases in diameter. The mounting may be of any suitable character, but in the present construction I have shown the roller as mounted in the ends of two arms 61 which are pivotally mounted on the respective side members of the main frame.

While I have shown and described one embodiment of my invention I wish it to be understood that I do not desire to be limited to the details of construction thereof as various modifications will occur to a person skilled in the art.

Having now fully described my invention, what I claim as new and desire to secure by Letters Patent, is:—

1. In a device of the character described, a cutter head rotatable about a longitudinal axis and having a series of flat faces arranged about the circumference thereof and extending lengthwise thereof, a base plate detachably secured to each of said faces, a flange extending outwardly from said base plate, the outer edge of said flange constituting a continuous cutting edge, and having every part of said edge spaced the same distance from the axis of said cutter head, a drum coöperating with said cutters, and means for rotating said cutter head and said drum.

2. In a device of the character described, a rotatable cutter head having a flat supporting face, a base plate detachably secured to said face, a continuous flange extending about the edge of said base plate and adapted to be slipped onto and off the same without detaching the plate from the cutter head, and means for securing said flange to the edge of said base plate.

3. In a device of the character described, a cutter head, a cutter carried by said cutter head, a drum coöperating with said cutter, means for imparting rotatory movement to said cutter head and said drum, a pair of feeding rollers arranged on each side of said cutting devices and adapted to feed material to and from said cutting devices and to maintain the same taut during the cutting operation, and means for acting on said taut material between said cutting devices and the feeding out rollers to cause the cut blanks to be separated from the body of said material.

4. In a device of the character described, a rotary cutter head, skeleton cutters carried thereby, a drum coöperating with said cutters, feed rollers to feed a web of material to said cutting devices, other feed rollers to feed the web material from said cutting devices and to maintain the same taut during the cutting operation, a guide rod interposed between said cutting devices and the last-mentioned feed rollers about which the web of material may be caused to pass, and so arranged as to impart a sharp turn to said material to cause the cut blanks to be separated from the web of material.

5. In a device of the character described, a rotary cutter head, skeleton cutters carried thereby, a drum coöperating with said cutters, feed rollers to feed a web of material to said cutting devices, other feed rollers to feed the web of material from said cutting devices and to maintain the same taut during the cutting operation, and a positively actuated device arranged between said cutting devices and the last-mentioned feed rollers and adapted to engage each blank to force the same from the web.

6. In a device of the character described, a rotary cutter head, skeleton cutters carried thereby, a drum coöperating with said cutters, feed rollers to feed a web of material to said cutting devices, other feed rollers to feed a web of material from said cutting devices and to maintain the same taut during the cutting operation, a shaft extending substantially parallel with said web of material between the cutting devices and the last-mentioned feed rollers, means to rotate said shaft in timed relation to the movement of said web of material, and a part carried by said shaft and arranged to engage the successive blanks to separate the same from said web of material.

7. In a device of the character described, a rotary cutter head, a flange-like cutter carried by said head and having a continuous cutting edge, a drum coöperating with said cutter, means for imparting rotatory movement to said cutter and to said drum, and a resilient plate rigidly mounted within said cutter and having a portion arranged adjacent to the plane of the cutting edge of said cutter, whereby said portion of said plate will be moved inward by the blank when the latter is severed by the cutter and will serve to eject said blank subsequent to the cutting operation, said portion of said plate being curved about an axis parallel with the axis of said cutter head.

8. In a device of the character described, a rotary cutter head, a flange-like cutter carried by said cutter head, a plate of resilient metal secured between its ends within said cutter and having its end portions curved outwardly toward the plane of the cutting edge of said cutter, said outer portions of said plate being curved both transversely and lengthwise of said plate.

9. In a device of the character described, the combination with a rotary cutter head, a cutter carried thereby, a drum coöperating with said cutter, and feeding devices for feeding a web of material to and from said cutting device, of a shaft to support a roll of material, bearings in which said shaft is mounted comprising adjustable caps, and retarding means for said shaft controlled by the adjustment of said caps.

10. In a device of the character described, the combination with a cutter head, a cutter carried thereby, a drum coöperating with said cutter, means for imparting rotatory movement to said cutter head and said drum, and means to support a roll comprising two webs of material wound together, means for feeding one of said webs of material to said cutting devices, and means actuated by the unwinding of said roll to rewind the other of said webs of material.

11. In a device of the character described, the combination with a cutter head, a cutter carried thereby, a drum coöperating with said cutter, means for imparting rotatory movement to said cutter head and said drum, means to support a roll comprising a web of material having a protecting strip wound therewith, and means for feeding said web of material to said cutting devices, of a roller arranged parallel with said roll and adapted to have said protecting strip wound about it, and devices for supporting said roller in such relation to said roll that it will be actuated by the unwinding of the material from said roll.

12. In a machine of the character described, the combination with a support for a roll of material comprising a web of material having a protecting strip wound therewith, and means for feeding the material from said roll, of a roller movably mounted above said roll of material and adapted to have the protecting strip from said roll of material wound about the same, and supporting means for said roller arranged to permit the roller and its contents to rest upon and to be rotated by the material as it is drawn from said roll.

In testimony whereof, I affix my signature hereto.

AXEL C. V. MALM.